United States Patent
Jonsson

(10) Patent No.: US 9,442,340 B2
(45) Date of Patent: Sep. 13, 2016

(54) ELECTRICALLY CONTROLLED GLASS IN A LAMP

(71) Applicant: Greenwave Systems PTE Ltd., Singapore (SG)

(72) Inventor: Karl S. Jonsson, Rancho Santa Margarita, CA (US)

(73) Assignee: Greenwave Systems, PTE LTD, Singapore (SG)

( * ) Notice: Subject to any disclaimer, the term of this patent is extended or adjusted under 35 U.S.C. 154(b) by 58 days.

(21) Appl. No.: 14/453,398

(22) Filed: Aug. 6, 2014

(65) Prior Publication Data

US 2014/0362580 A1 Dec. 11, 2014

Related U.S. Application Data

(63) Continuation of application No. 12/838,743, filed on Jul. 19, 2010, now Pat. No. 8,820,981.

(51) Int. Cl.
*G02F 1/00* (2006.01)
*G02F 1/163* (2006.01)
(Continued)

(52) U.S. Cl.
CPC ............... *G02F 1/163* (2013.01); *F21K 9/13* (2013.01); *F21K 9/135* (2013.01); *F21K 9/58* (2013.01); *F21V 5/04* (2013.01); *F21V 7/0025* (2013.01); *F21V 7/22* (2013.01); *F21V 9/10* (2013.01); *F21V 13/02* (2013.01); *F21V 14/003* (2013.01); *G02F 1/19* (2013.01); *H01J 61/025* (2013.01); *H01J 61/40* (2013.01); *H01J 61/56* (2013.01);
(Continued)

(58) Field of Classification Search
CPC ........................... H05B 33/0803; G02F 1/163
See application file for complete search history.

(56) References Cited

U.S. PATENT DOCUMENTS

| 4,612,670 A | 9/1986 | Henderson |
| 4,727,457 A | 2/1988 | Thillays |

(Continued)

FOREIGN PATENT DOCUMENTS

| JP | 06260287 A | 9/1994 |
| JP | 2001185371 A | 7/2001 |

(Continued)

OTHER PUBLICATIONS

"First LED Replacement Bulb Unveiled", Photonics.com, May 12, 2010, http://www.photonics.com/Article.aspx?AID=42190, retrieved Jul. 7, 2010.

(Continued)

*Primary Examiner* — Sean Gramling
*Assistant Examiner* — Gerald J Sufleta, II
(74) *Attorney, Agent, or Firm* — Young's Patent Services; Bruce A. Young

(57) ABSTRACT

An apparatus for generating light may be comprised of a light source with a lens interposed in a light path from the light source. The lens may be comprised of two or more sections wherein at least one section may be comprised of smart glass. Electrical circuitry may be configured to control a transparency state of the smart glass lens sections. Another embodiment may have two reflectors wherein one of the reflectors may be interposed between the light source and the other reflector and may be comprised of smart glass with a transparent state and a reflective state so that two different reflection patterns may be created. A method for illumination wherein at least one area's illumination is controlled by a section of smart glass is also disclosed.

20 Claims, 7 Drawing Sheets

(51) Int. Cl.

| | |
|---|---|
| *F21K 99/00* | (2016.01) |
| *F21V 5/04* | (2006.01) |
| *F21V 7/00* | (2006.01) |
| *F21V 7/22* | (2006.01) |
| *F21V 9/10* | (2006.01) |
| *F21V 14/00* | (2006.01) |
| *H01J 61/02* | (2006.01) |
| *H01J 61/40* | (2006.01) |
| *H01J 61/56* | (2006.01) |
| *H01K 1/26* | (2006.01) |
| *H01K 1/30* | (2006.01) |
| *H01K 1/62* | (2006.01) |
| *H05B 33/08* | (2006.01) |
| *H05B 37/02* | (2006.01) |
| *F21V 13/02* | (2006.01) |
| *G02F 1/19* | (2006.01) |
| *F21Y 101/02* | (2006.01) |

(52) U.S. Cl.
CPC ........ *H01K 1/26* (2013.01); *H01K 1/30* (2013.01); *H01K 1/62* (2013.01); *H05B 33/0803* (2013.01); *H05B 37/0272* (2013.01); *F21Y 2101/02* (2013.01); *Y02B 20/48* (2013.01)

(56) References Cited

U.S. PATENT DOCUMENTS

| | | | |
|---|---|---|---|
| 5,534,709 | A | 7/1996 | Yashimoto et al. |
| 5,813,753 | A | 9/1998 | Vriens et al. |
| 7,109,514 | B2 | 9/2006 | Tazaki et al. |
| 7,256,057 | B2 | 8/2007 | Schardt et al. |
| 7,956,546 | B2 | 6/2011 | Hasnain |
| 8,013,545 | B2 | 9/2011 | Jonsson |
| 8,200,390 | B2* | 6/2012 | Brown .............. B60Q 1/14 359/265 |
| 8,421,376 | B2 | 4/2013 | Jonsson |
| 8,531,137 | B2 | 9/2013 | Jonsson |
| 2003/0193813 | A1 | 10/2003 | Collins |
| 2004/0165245 | A1 | 8/2004 | Carlson et al. |
| 2005/0200934 | A1 | 9/2005 | Callahan et al. |
| 2006/0110166 | A1 | 5/2006 | Allen |
| 2007/0019408 | A1 | 1/2007 | Mcguire et al. |
| 2008/0218434 | A1 | 9/2008 | Kelly et al. |
| 2008/0224631 | A1 | 9/2008 | Melanson |
| 2009/0034284 | A1 | 2/2009 | Li et al. |
| 2009/0076329 | A1 | 3/2009 | Su et al. |
| 2009/0103166 | A1 | 4/2009 | Khazeni et al. |
| 2009/0166584 | A1 | 7/2009 | Shimooka et al. |
| 2009/0195186 | A1 | 8/2009 | Guest et al. |
| 2009/0284148 | A1 | 11/2009 | Iwanaga |
| 2009/0315480 | A1 | 12/2009 | Yan et al. |
| 2010/0046234 | A1 | 2/2010 | Abu-Ageel |
| 2010/0084992 | A1* | 4/2010 | Valois ............ H05B 37/0254 315/291 |
| 2010/0097779 | A1 | 4/2010 | Gladnick et al. |
| 2010/0165599 | A1 | 7/2010 | Allen |
| 2010/0265707 | A1* | 10/2010 | Van Herpen ......... F21V 14/003 362/235 |
| 2011/0042706 | A1 | 2/2011 | Tanaka et al. |
| 2011/0063864 | A1 | 3/2011 | Brown et al. |
| 2011/0095687 | A1 | 4/2011 | Jonsson |
| 2011/0309735 | A1 | 12/2011 | Parker et al. |
| 2011/0315878 | A1 | 12/2011 | Vizgaitis |
| 2012/0013238 | A1 | 1/2012 | Jonsson |
| 2012/0014086 | A1 | 1/2012 | Jonsson |
| 2012/0126699 | A1 | 5/2012 | Zittel |
| 2012/0152273 | A1* | 6/2012 | Kergosien ........... A45D 29/001 132/285 |

FOREIGN PATENT DOCUMENTS

| | | |
|---|---|---|
| JP | 2001307505 A | 11/2001 |
| JP | 2006172820 A | 6/2006 |
| JP | 2006525640 A | 11/2006 |
| JP | 2008123737 A | 5/2008 |
| KR | 1020020034855 A | 5/2002 |
| KR | 2009009465 A | 1/2009 |
| WO | 03026358 A1 | 3/2003 |

OTHER PUBLICATIONS

Emma Ritch, "Philips launches its first mainstream LED light", Cleantech Group, Feb. 20, 2009, http://cleantech.com/news/4197/philips-launches-first-mainstream-led, retrieved on Jul. 7, 2010.

Michael Kanellow, "Philips LED Bulb to Cost Around $60", Greentech Media, May 12, 2010, http://www.greentechmedia.com/articles/read/philips-led-bulb-to-cost-around-60/, retrieved on Jul. 7, 2010.

Rhee Seokjae, "Energy Saving Bulb", Bugs' Design Lab. Blog, Dec. 2008, http://bugsrhee.blogspot.com/2009/03/ecobulb.html, retrieved on Jul. 7, 2010.

Steve Bush, "Philips Fortimo white light uses separate phosphor plate", Electronics Weekly, May 30, 2008, http://www.electronicsweekly.com/Articles/2008/05/30/43838/philips-fortimo-white-light-uses-separate-phosphor-plate.htm, retrieved Jul. 7, 2010.

* cited by examiner

ELECTRICALLY CONTROLLED GLASS IN A LAMP

CROSS-REFERENCE TO RELATED APPLICATIONS

This application is a continuation of U.S. patent application Ser. No. 12/838,743, entitled "Electrically Controlled Glass in a Lamp" and filed on Jul. 19, 2010, the entire contents of which are hereby incorporated by reference for any and all purposes.

BACKGROUND

1. Technical Field

The present subject matter relates to lighting apparatus. More specifically, it relates to using materials with electrically controlled transparency in a lighting apparatus to control the path of the light output.

2. Description of Related Art

Lighting apparatus come in many different forms. In some cases, the lighting apparatus may be a light fixture designed to be permanently installed into a structure. In other cases, it may be a stand-alone lamp that can be plugged into the wall. In yet other cases, the lighting apparatus may be a sub-assembly, such as a light bulb, that may be designed to be incorporated into another device. The light created by the lighting apparatus may have a brightness, a color, and an illumination pattern associated with it. Several different techniques exist for controlling these parameters in the prior art. For example some bulbs of a similar shape may have similar brightness and color, but have different areas of coverage, e.g. a flood light bulb and a spot light bulb. In another example, a stage light may have an adjustable focus to allow its coverage area to be varied from a very wide angle to an intense small spot. In another example, a desk lamp may have a flexible neck allowing the light to be manually directed to a desired spot.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

A lens, as used in this specification and following claims, may be thought of as a piece of glass, plastic, or other transparent material that light may pass through. As the light passes through the lens, the light may or may not be refracted. In some embodiments, a lens, or a section of a lens, might also be a space or air gap where light may be transmitted.

"Smart glass", as used in this specification and following claims, refers to a class of devices or materials based on glass, plastic, or other material having at least two different states of transparency wherein the transparency can be controlled using electricity.

The term "LED" refers to a diode that emits light, whether visible, ultraviolet, or infrared, and whether coherent or incoherent. The term as used herein includes incoherent polymer-encased semiconductor devices marketed as "LEDs", whether of the conventional or super-radiant variety. The term as used herein also includes semiconductor laser diodes and diodes that are not polymer-encased. It also includes LEDs that include a phosphor or nanocrystals to change their spectral output. It may also include organic LEDs.

Reference now is made in detail to the examples illustrated in the accompanying drawings and discussed below.

Figure 1A:
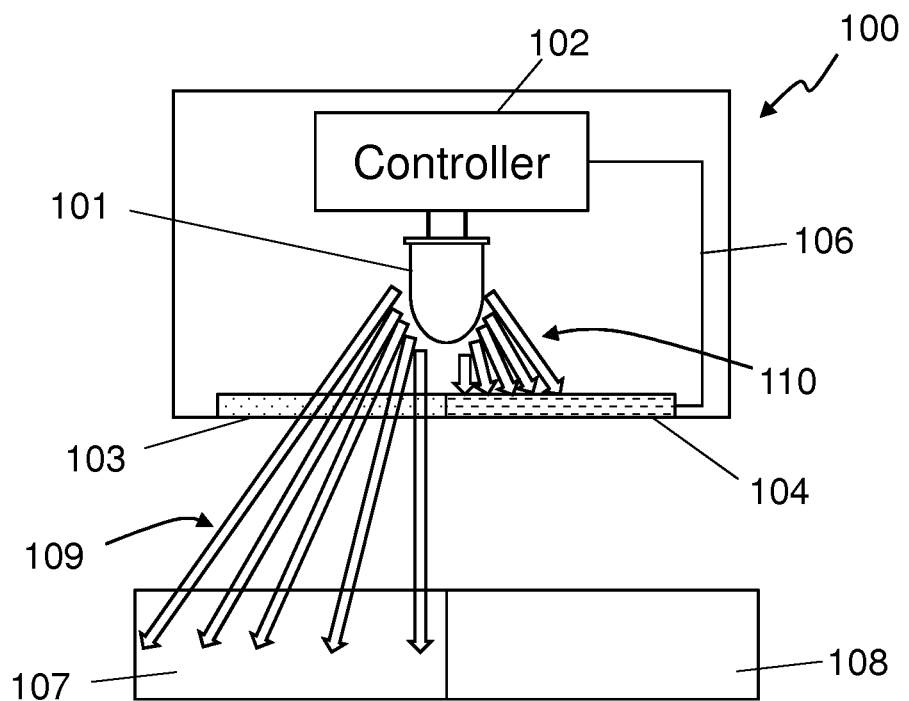
FIGS. 1A and 1B show an embodiment of a lighting apparatus utilizing a lens section comprised of smart glass.
Figure 1B:
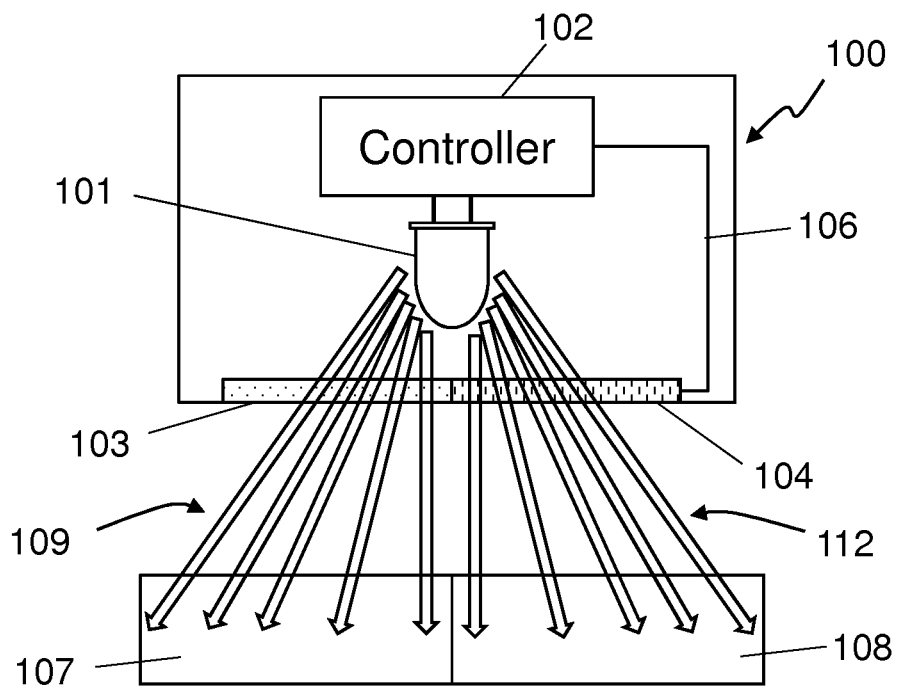

FIGS. 1A and 1B show an embodiment of a lighting apparatus 100 utilizing a lens section comprised of smart glass 104. In the embodiment shown, the lighting apparatus 100 may be comprised of a light source 101 with a lens 103, 104 interposed in a light path from the light source 101. The light source 101 may be one or more LEDs in some embodiments. In other embodiments, the light source 101 may be, but is not limited to, an incandescent bulb, a fluorescent bulb, a halogen bulb, a chemical light, an arc light, or any other type of light source. The lens may be comprised of a first section 103 and a second section 104. The first lens section 103 may be comprised of a transparent material including, but not limited to, glass, plastic, or an air gap or open space. If the first lens section is comprised of an open space or air gap, the first lens section may be thought of in a virtual sense as located adjacent to the second lens section 104. The second lens section 104 may be comprised of smart glass.

Smart glass refers to a material that can have its transparency controlled using electricity. Some embodiments of smart glass may utilize a liquid crystal structure wherein the incoming light may be polarized by passing through a polarizing film and then sent to a liquid crystal that may be alternatively configured as polarized in phase with the polarizing film, allowing the incoming light to pass through, or out of phase with the polarizing film blocking the light. Other embodiments may use electrochromic devices that change their opacity if an electric field is applied. Some embodiments may use transition-metal hydride electrochomics that may have the added characteristic of reflecting the light instead of absorbing it if it is set to a non-transparent state. Other embodiments may use suspended particle devices (SPDs) wherein a thin film laminate of rod-like particles are suspended in a fluid and applied to a glass or plastic substrate. Without an electric field applied to the SPD, the particles absorb the light thereby blocking it. With an electric field applied, the particles align allowing light to pass. One embodiment may use polymer dispersed light crystal devices where liquid crystals are dissolved or dispersed into a liquid polymer before the polymer is solidified. With no electric field applied, the random arrangement of the liquid crystals may block light but applying an electric field may align the liquid crystals allowing light to pass. Some embodiments may use micro-blinds composed of rolled thin metal blinds on the glass that are transparent without an applied magnetic field. Applying an electric field may cause the rolled micro-blinds to stretch out and block light. Any device that, under electrical control, alternatively transmits and either blocks or reflects light may be used for smart glass.

Returning now to FIGS. 1A and 1B, electrical circuitry, such as a controller 102, may be configured to control a transparency state of the smart glass lens section 104. The electrical circuitry may be comprised of a microcontroller, a finite state machine, a set of electromechanical or mechanical switches, a general purpose computer, or any other electrical circuitry capable of controlling the smart glass. The controller 102 of this embodiment may also control the light source 101 by providing the necessary electrical power to the light source 101. In the embodiment shown, the first lens section 103 may be comprised of a transparent material and light 109 from the light source 101 may be transmitted through the first lens section 103 to illuminate a first area 107. Since the first lens section 103 may not be controllable, light 109 may be transmitted through the first lens section 103 as long as the light source 101 is on. The second lens section 104 may be controlled by the controller 102 using control lines 106. If the controller 102 sets the second lens section 104 to be opaque, the light 110 is blocked and the second area 108 is not illuminated as shown in FIG. 1A. If the controller 102 sets the second lens section 104 to be transparent, the light 112 is transmitted through the second lens section 104 and illuminates the second area 108 as shown in FIG. 1B. In some embodiments, the smart glass may allow transparency states other than opaque and transparent. Some embodiments may allow the smart glass to be set in a semi-transparent state. Other embodiments may allow the smart glass to act as a color filter, changing the color of the transmitted light 112.

Figure 2A:
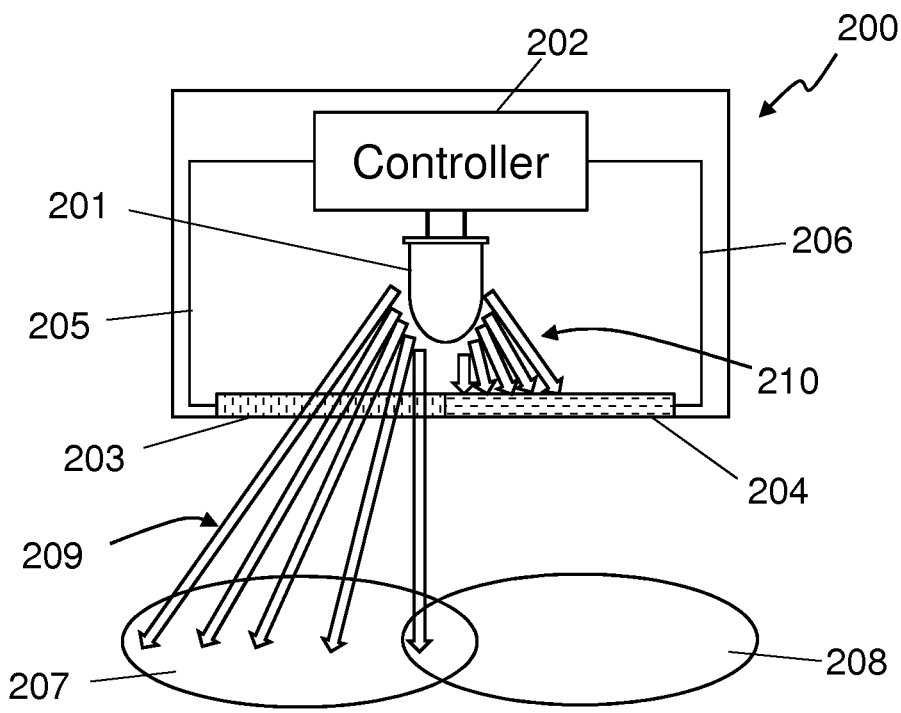
FIGS. 2A and 2B show an embodiment of a lighting apparatus utilizing two lens sections comprised of smart glass.
Figure 2B:
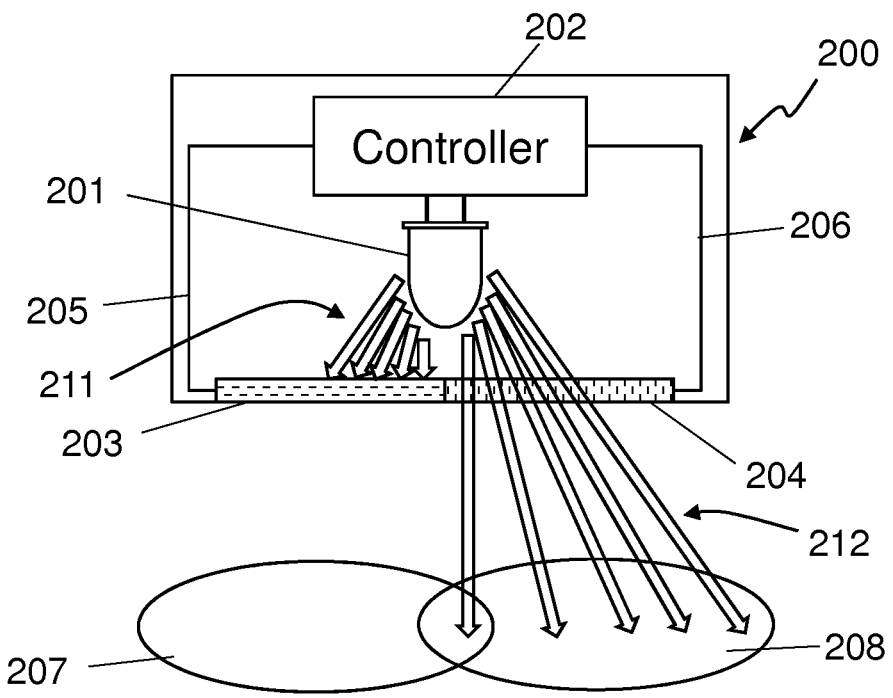

FIGS. 2A and 2B show an embodiment of a lighting apparatus 200 with a lens comprised of a first lens section 203 and a second lens section 204, wherein both lens sections are comprised of smart glass. In the embodiment shown, the lighting apparatus 200 may be comprised of a LED 201 with a lens 203, 204 interposed in a light path from the LED 201. A controller 202 may be configured to control a transparency state of the smart glass lens sections 203, 204. In FIG. 2A, the first lens section 203 may be set to a transparent state by the controller 202 using the control lines 205, and the second lens section 204 may be set to an opaque state by the controller 202 using the control lines 206. Light 209 from LED 201 may be transmitted through the first lens section 203 to illuminate a first area 207. Light 210 may be blocked by the opaque second lens section 204 and the second area 208 may not be illuminated. Turning now to FIG. 2B, the first lens section 203 may be set to an opaque state by the controller 202 using the control lines 205, and the second lens section 204 may be set to a transparent state by the controller 202 using the control lines 206. Light 211 from LED 201 may be blocked by the first lens section 203 so that the first area 207 may not be illuminated. Light 212 may be transmitted through the second lens section 204 so that the second area 208 may be illuminated. In some embodiments, the first area 207 and the second area 208 may overlap.

Figure 3:
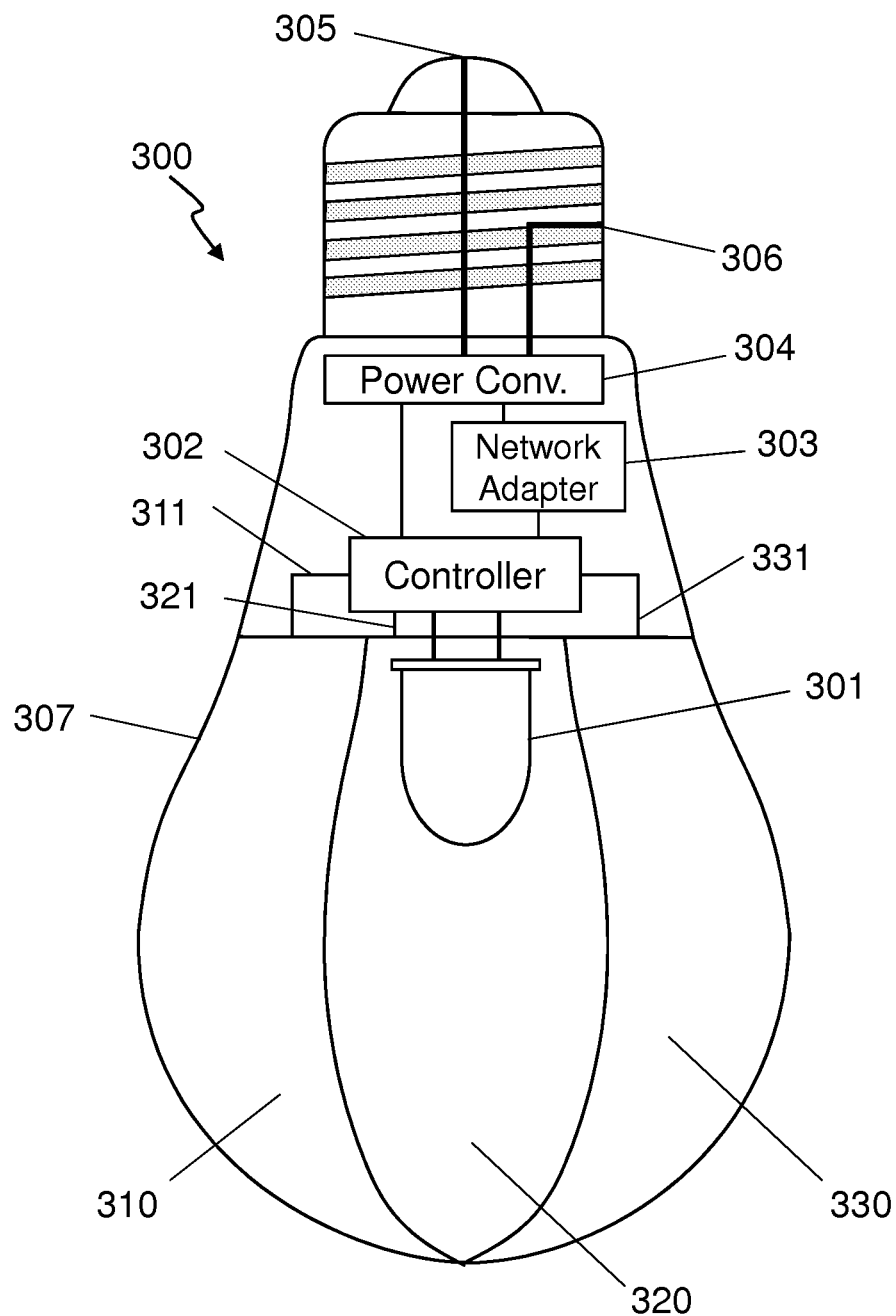
FIG. 3 shows an embodiment of a lighting apparatus in a traditional form factor utilizing multiple lens sections comprised of smart glass.

FIG. 3 shows an embodiment of a lighting apparatus 300 in a traditional form factor utilizing multiple lens sections 310, 320, 330 comprised of smart glass. A light bulb 300 may have an outer enclosure 307 comprising a plurality of sections 310, 320, 330 that may be comprised of smart glass. Any embodiment of smart glass or non-controllable transparent material may be used for each section 310, 320, 330. The enclosure 307 may be attached to a base with electrical contacts 305, 306. A controller 302 may be incorporated in the light bulb 300. The controller 302 may receive power from the power converter 304 which may be coupled to the electrical contacts 305,306. The controller 302 may also control the LED 301 by driving it with the required electrical power. The controller 302 may also be coupled to the smart glass lens sections 310, 320, 330, allowing the controller 302 to control a transparency state for each smart glass lens section 310, 320, 330. The controller 302 may also be communicatively coupled to a network adapter 303 providing a network connection, allowing the controller 302 to receive communication from other devices on the network. In some embodiments the communication may be received from a power line network that may utilize radio frequency communication techniques and/or may be coupled to the electrical contacts 305, 306. In other embodiments, the communication may come from radio frequency signals received from an antenna. In other embodiments, a wired communication protocol may be coupled to the network adapter 303, and in yet additional embodiments, optical communication techniques may be used to receive communications. Any networking protocol may be utilized for communications including, but not limited to HomePlug, Zigbee (802.15.4), ZWave, or Wi-Fi (802.11). In some embodiments the light bulb 300 may have a user interface comprising buttons, knobs, switches or other user manipulatable controls. In many embodiments the communication received by the controller 302 from the network connection through the network adapter 303 may comprise control information for the smart glass lens sections. In some embodiments, the control information may explicitly identify the desired transparency state of each smart glass lens section. In other embodiments, the states may be implicitly identified by the request. Once the controller 302 has received the control information, it determines which lens sections 310, 320, 330 to control.

In the embodiment shown in FIG. 3, it may be assumed, for the sake of example, there are four lens sections. Other embodiments may have any number of lens sections that each may be comprised of smart glass or non-controllable transparent material. One lens section may be on the back side of the light bulb 300 as shown and three lens sections 310, 320, 330 may be visible in FIG. 3. The lens section on the back of the light bulb 300 may be made of a non-controllable transparent material. But the other three lens sections, 310, 320, 330 may be comprised of smart glass and may be coupled to the controller 302 with control lines 311, 321, 331. In the example shown, control information has been received from the network by the network adapter 303 and passed to the controller 302 indicating that the first lens section 310 and the third lens section 330 should be set to opaque and the second lens section 320 should be set to transparent. The controller 302 then may send the appropriate electrical waveforms on the control line 311 to set the first lens section 310 to opaque, the appropriate electrical waveforms on the control line 331 to set the third lens section 330 to opaque and the appropriate waveform on the control line 321 to set the second lens section 320 to transparent. The LED 301 is visible through the transparent second lens section 320. The details of the electrical waveform to set the smart glass to transparent or opaque are dependent on the exact type of smart glass used and may vary between embodiments.

The light bulb 300 may be of any size or shape. It may be a component to be used in a light fixture or it may be designed as a stand-alone light fixture to be directly installed into a building or other structure. In some embodiments, the light bulb may be designed to be substantially the same size and shape as a standard incandescent light bulb. Although there are far too many standard incandescent bulb sizes and shapes to list here, such standard incandescent light bulbs include, but are not limited to, "A" type bulbous shaped general illumination bulbs such as an A19 or A21 bulb with E26 or E27, or other sizes of Edison bases, decorative type candle (B), twisted candle, bent-tip candle (CA & BA), fancy round (P) and globe (G) type bulbs with various types of bases including Edison bases of various sizes and bayonet type bases. Other embodiments may replicate the size and shape of reflector (R) including but not limited to R30 and R38 bulbs with E26, E27 or other sizes of Edison bases. Yet additional embodiments may include flood (FL), elliptical reflector (ER) and parabolic aluminized reflector (PAR) type bulbs, including but not limited to PAR30 and PAR38 bulbs with E26, E27, or other sizes of Edison bases. In other cases, the light bulb may replicate the size and shape of a standard bulb used in an automobile application, many of which utilize a bayonet type base. Other embodiments may be made to match halogen or other types of bulbs with bi-pin or other types of bases and various different shapes. In some cases the light bulb 300 may be designed for new applications and may have a new and unique size, shape and electrical connection.

Figure 4:
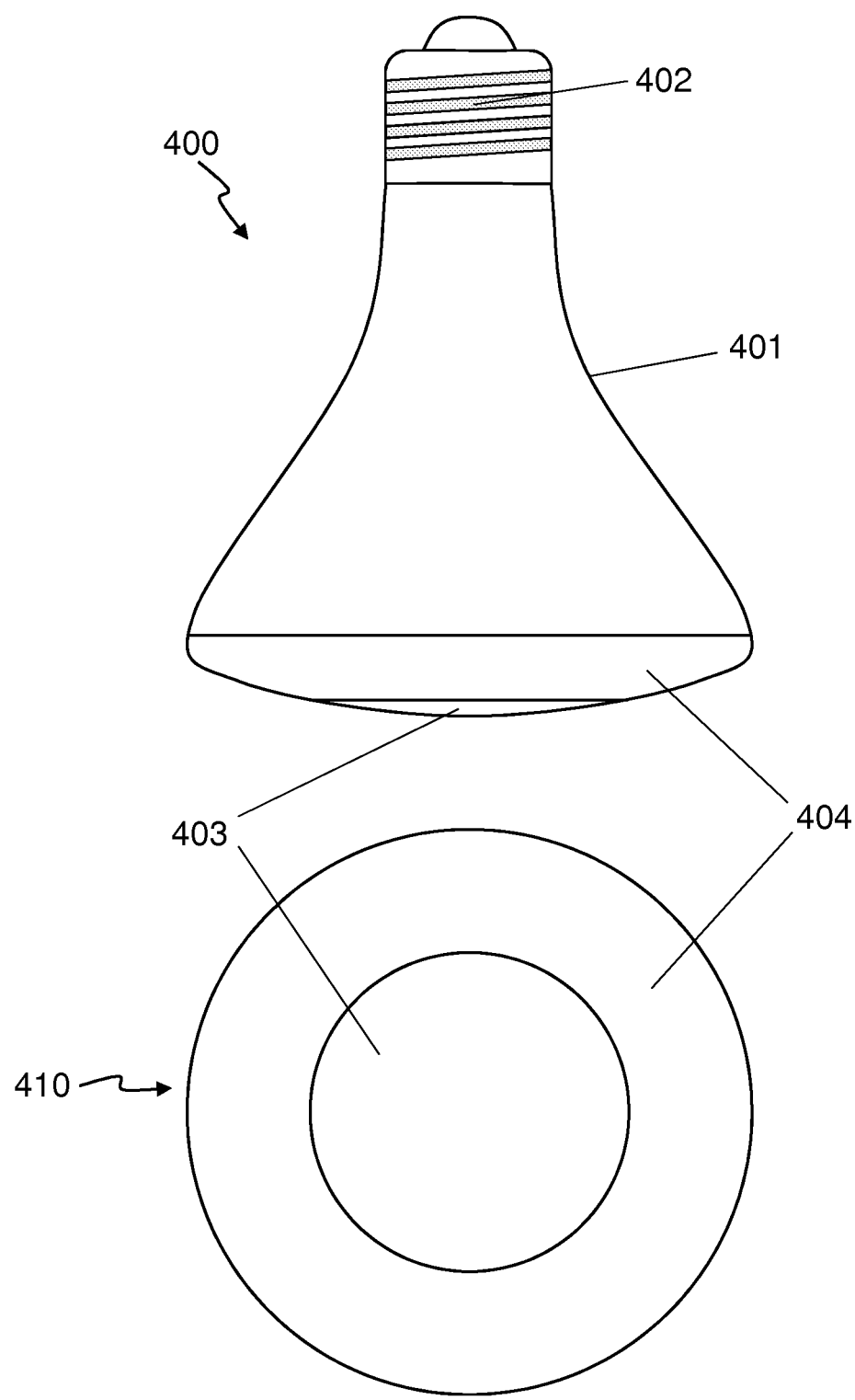
FIG. 4 shows an embodiment of a lighting apparatus in a traditional form factor utilizing a lens section comprised of smart glass to change between a flood and a spot illumination pattern.

FIG. 4 shows an embodiment of a lighting apparatus in a traditional form factor of a light bulb 400,410 utilizing a lens section 404 comprised of smart glass to change between a flood and a spot illumination pattern. A side view 400 and a bottom view 410 of the light bulb are included in FIG. 4. Any type of lighting apparatus may utilize a similar configuration to the embodiment shown in FIG. 4, but the embodiment shown may be similar to an R30 type bulb. The light bulb 400 may include an enclosure 401 that may be substantially opaque, and an Edison type base 402 although other embodiments may use a different style enclosure and/or a different type of base. A first lens section 403 may be comprised of a transparent material such as glass or plastic. A second lens section 404 may be comprised of smart glass. A controller and a light source (not shown) may be inside the enclosure. If the light source is turned on, light may be transmitted through the first lens section 403. If the second lens section 404 is set to be opaque by the controller, the light bulb 400 may act as a spot light, illuminating a small area through the first lens section 403. If the second lens section 404 is set to transparent by the controller, the light bulb 400 may act as a flood light, illuminating a larger area through both the first lens section 403 and the second lens section 404.

Figure 5A:
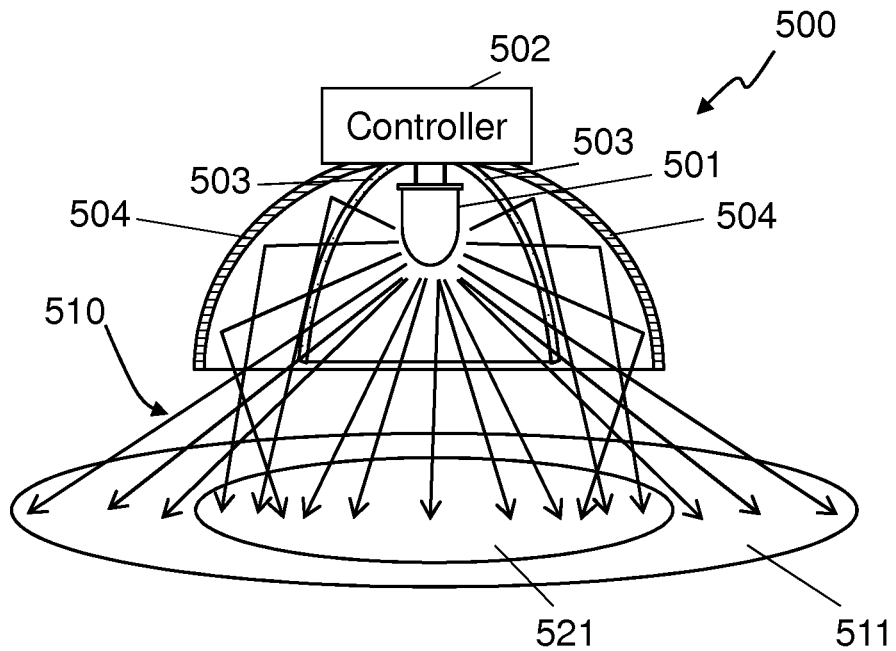
FIGS. 5A and 5B show an embodiment of a lighting apparatus utilizing two reflectors wherein one reflector is comprised of smart glass.
Figure 5B:
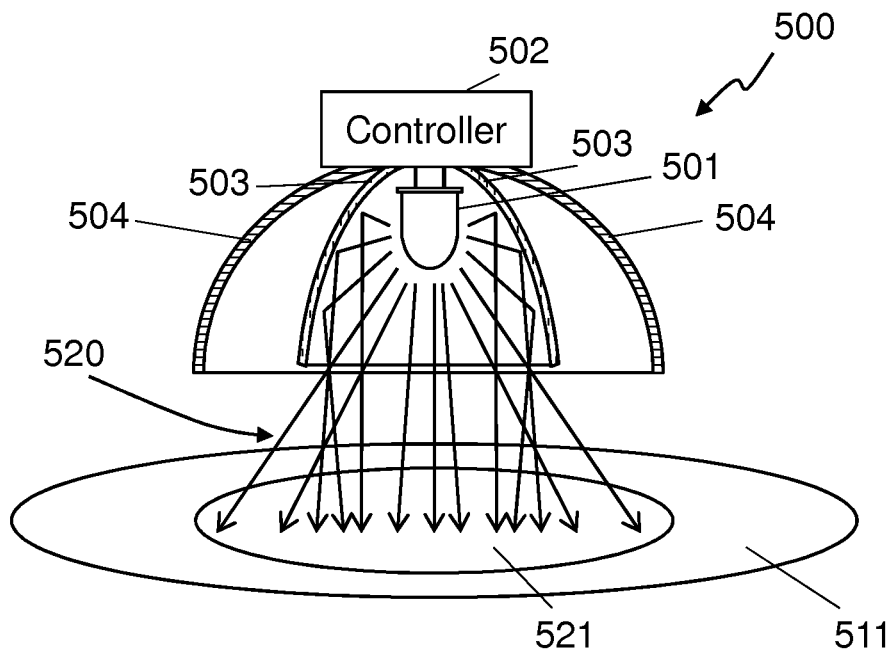

FIGS. 5A and 5B shows a cross-sectional view of an embodiment of a lighting apparatus 500 utilizing two reflectors 503, 504 wherein one reflector is comprised of smart glass. An LED 501 may be located in a first reflector 504. The first reflector 504 may be made of a highly reflective material. In some embodiments the first reflector 504 may be in the shape of a partial spheroid, a 3D partial ellipsoid, or a 3D parabolic section with the LED 501 located near the focus of the parabola. Other shapes may also be used in other embodiments. A second reflector 503 may be interposed between the LED 501 and the first reflector 504. The shape of the second reflector 503 may be that of a partial spheroid, a 3D partial ellipsoid, a 3D parabolic section, or any other shape for reflecting the light 520 from the LED 501. The second reflector 503 may be comprised of smart glass having a transparent state and a highly reflective state such as a transition-metal hydride electrochomic based smart glass. In FIG. 5A, the controller 502 may set the second reflector 503 to the transparent state. Some light rays 510 from the LED 501 may exit the lighting apparatus 500 directly without encountering either reflector. Other light rays 510 may pass through the transparent second reflector 503 out of the lighting apparatus 500 without encountering the first reflector 504. Yet more light rays 510 may pass through the transparent second reflector 503 and then reflect off the first reflector 504 before exiting the lighting apparatus 500. The totality of the light rays 510 exiting the lighting apparatus 500 may illuminate a first area 511. FIG. 5B shows a different condition of the lighting apparatus 500 wherein the controller 502 may set the second reflector 503 to a reflective state. In the embodiment shown, the second reflector 503 has a more narrow focus than the first reflector 504. Some of the light rays 520 from the LED 501 may exit the lighting apparatus directly while other light rays 520 may reflect off the second reflector 503. The combined light rays 520 leaving the lighting apparatus 500 in FIG. 5B illuminate a second area 521. Because the second reflector 503 has a narrower focus than the first reflector 504 in the embodiment shown, the illuminated second area 521 may be smaller than the illuminated first area 511 in FIG. 5A. Other embodiments may use different configurations of the first reflector 504 and the second reflector 503 to achieve different illumination patterns. Some embodiments may utilize additional reflectors comprised of smart glass and yet other embodiments may have multiple sections of smart glass within a single reflector, and each section may be individually controlled by the controller 502.

Figure 6:
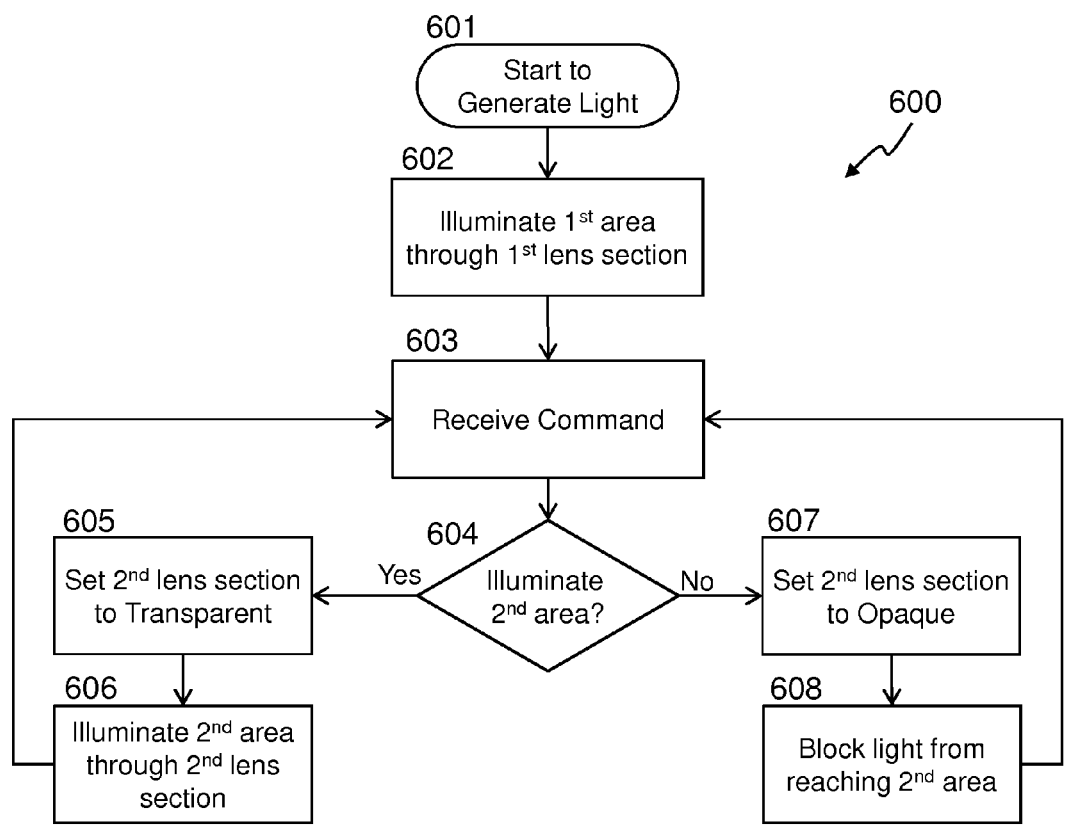
FIG. 6 shows a flow chart of an embodiment method of illumination using smart glass.

FIG. 6 shows a flow chart 600 of a method of illumination using smart glass. It should be understood that unless otherwise noted below, no particular order is implied for the blocks of this method and in some cases, multiple blocks may happen simultaneously. At block 601, light may be generated by a light source such as a LED, an incandescent bulb, a fluorescent bulb, or any other type of light source. At block 602 the light may pass through the first lens section to illuminate a first area. The first lens section may be made of any transparent material such as glass, plastic, an air gap, or any other material. At block 603, the controller may wait for a command to select whether the second lens section should be set to transparent or opaque. After a command is received, it may be evaluated at block 604 to determine what to do. If the command is to set the second lens section to transparent, that may be done at block 605 allowing light to pass through the second lens section and illuminate a second area at block 606. Then the controller may wait for another command again at block 603. If the command is to set the second lens section to opaque, that may be done at block 607, blocking light so that the second area is not illuminated at block 608. Then the controller may wait for another command again at block 603.

Figure 7:
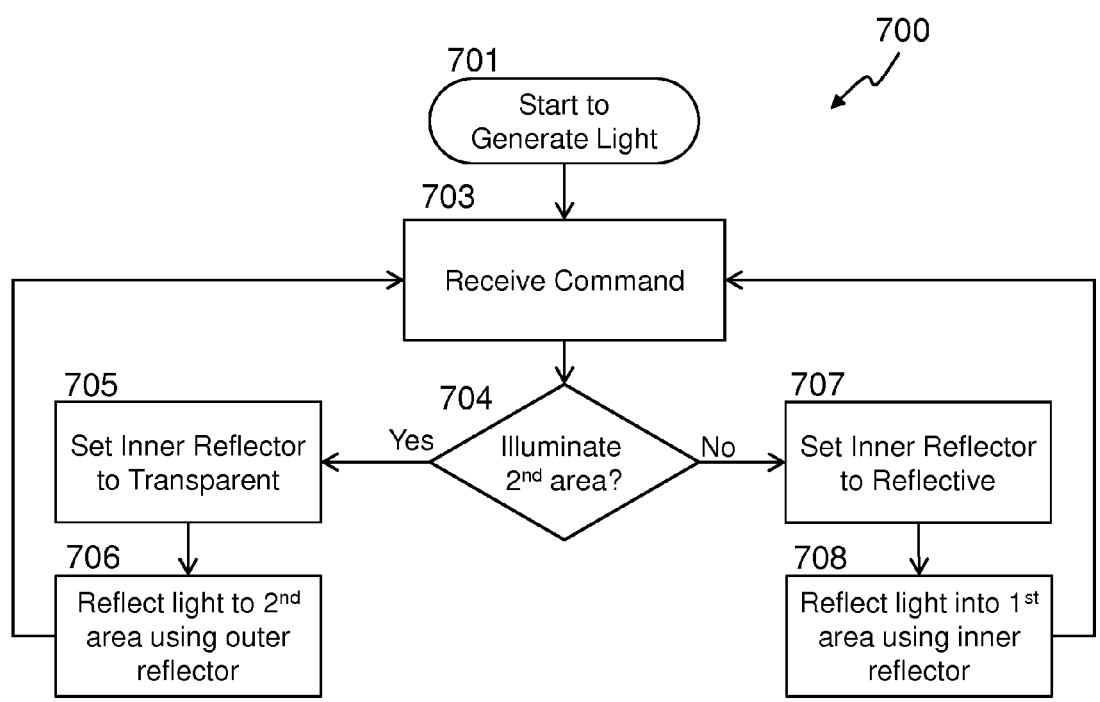
FIG. 7 shows a flow chart of an alternative embodiment of a method of illumination using smart glass.

FIG. 7 shows a flow chart 700 of an alternative embodiment of a method of illumination using smart glass. It should be understood that unless otherwise noted below, no particular order is implied for the blocks of this method and in some cases, multiple blocks may happen simultaneously. At block 701, light may be generated by a light source such as a LED, an incandescent bulb, a fluorescent bulb, or any other type of light source. At block 703, the controller may wait for a command to select whether an inner reflector should be set to transparent or reflective. After a command is received, it may be evaluated at block 704 to determine what to do. If the command is to illuminate a $2^{nd}$ area, that may be done at block 705 by setting the inner reflector to be transparent, allowing light to pass through the inner reflector, reflect off the outer reflector, and illuminate a second area at block 706. Then the controller may wait for another command again at block 703. If the command is to illuminate only the $1^{st}$ area, that may be done by setting the inner reflector to reflective at block 707, reflecting light into the $1^{st}$ area at block 708. Then the controller may wait for another command again at block 703. Note that the two areas may be distinct, overlapping, or one area may be a subset of the other area.

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A lighting apparatus comprising:
   a light source positioned in the lighting apparatus;
   a lens comprising a first section and a second section, the first section and the second section each comprising smart glass, wherein the lens is configured to create a first light path from the light source that passes through the first section of the lens, but not the second section of the lens, before exiting the lighting apparatus, and a second light path from the light source that passes through the second section of the lens, but not the first section of the lens, before exiting the lighting apparatus; and electrical circuitry, positioned in the lighting apparatus and electrically coupled to both the first section and the second section of the lens, the electrical circuitry configured to:
      set a transparency state of the smart glass of the first section of the lens to one of at least two different transparency states at a first time that the light source emits light; and
      set a transparency state of the smart glass of the second section of the lens to one of at least two different transparency states at a second time that the light source emits light;
      wherein the transparency state of the smart glass of the first section of the lens is different than the transparency state of the smart glass of the second section of the lens during at least some time periods that the light source emits light.

2. The lighting apparatus of claim 1 wherein the lighting apparatus is configured to illuminate a first illumination pattern through the first section of the lens and the lighting apparatus is configured to illuminate a second illumination pattern through the second section of the lens.

3. The lighting apparatus of claim 2 wherein the first illumination pattern and the second illumination pattern are partially overlapping.

4. The lighting apparatus of claim 1 wherein the light source comprises one or more LEDs.

5. The lighting apparatus of claim 1 wherein the electrical circuitry is further configured to control a visible color filtering state of the smart glass of the first section of the lens.

6. The lighting apparatus of claim 1, the lens further comprising a third section that comprises smart glass, wherein the lens is further configured to create a third light path from the light source that passes through the third section of the lens, but not the first section or second section of the lens, before exiting the lighting apparatus;
   wherein the electrical circuitry is further configured to set a transparency state of the smart glass of the third section of the lens to one of at least two different transparency states independently from the transparency state of the smart glass of the first section and the second section of the lens.

7. The lighting apparatus of claim 1, the electrical circuitry comprising:
   a controller; and
   network circuitry coupled to the controller and configured to receive data from a network;
   wherein the controller is configured to receive network data from the network circuitry and control the transparency state of the smart glass of the first section of the lens and the smart glass of the second section of the lens based on the network data.

8. The lighting apparatus of claim 1 further comprising:
   an enclosure at least partially surrounding the light source and the electrical circuitry; and
   an electrical connection for receiving power.

9. The lighting apparatus of claim 8 wherein the enclosure is substantially the same size and shape as a typical incandescent light bulb and the electrical connection comprises an Edison screw fitting base.

10. A lighting apparatus comprising:
    a light source positioned in the lighting apparatus;
    a first reflector, coupled to the light source and configured to create a first reflection pattern of light from the light source outside of the lighting apparatus;

a second reflector, configured to create a second reflection pattern of the light from the light source outside of the lighting apparatus that is different than the first reflection pattern, interposed between the light source and the first reflector, the second reflector comprising smart glass having a reflectivity state; and electrical circuitry configured to set the reflectivity state of the smart glass;

wherein if the reflectivity state of the smart glass of the second reflector is substantially transparent, the lighting apparatus is configured to shine the light from the light source through the second reflector to be reflected in the form of the first reflection pattern with the first reflector; and wherein if the reflectivity state of the smart glass of the second reflector is substantially reflective, the lighting apparatus is configured to substantially block light from the light source from reaching the first reflector and reflect the light from the light source in the form of the second reflection pattern with the second.

11. The lighting apparatus of claim 10 wherein the light source comprises one or more LEDs.

12. The lighting apparatus of claim 10 further comprising:
an enclosure at least partially surrounding the light source and the electrical circuitry; and
an electrical connection for receiving power.

13. The lighting apparatus of claim 1 wherein the first time and the second time are substantially simultaneous.

14. The lighting apparatus of claim 1 wherein the electrical circuitry is further configured to set the transparency of the smart glass of the first section of the lens independently from the transparency state of the smart glass of the second section of the lens.

15. A method of illumination comprising:
generating light from a light source positioned in a lighting apparatus;
illuminating a first area outside of the lighting apparatus by setting a reflectivity state of smart glass of a first reflector of the lighting apparatus to a substantially reflective state to reflect the light from the light source off the first reflector to the first area; and
illuminating a second area outside of the lighting apparatus by setting the reflectivity state of the smart glass of the first reflector to a substantially transparent state to shine the light from the light source through the first reflector to a second reflector of the lighting apparatus to reflect the light off the second reflector to the second area.

16. The method of claim 15 further comprising:
receiving a command over a network; and
setting the reflectivity state of the smart glass of the first reflector based on the command.

17. A method of illumination comprising:
generating light from a light source positioned in a lighting apparatus;
setting a transparency state of smart glass in a first section of a lens of the lighting apparatus to control illumination of a first area outside of the lighting apparatus using a first light path, wherein the first light path passes from the light source, through the first section of the lens, to the first area, without passing through a second section of the lens; and
setting a transparency state of smart glass in the second section of the lens of the lighting apparatus to control illumination of a second area outside of the lighting apparatus using a second light path, wherein the second light path passes from the light source, through the second section of the lens, to the second area, without passing through the first section of the lens;
wherein the transparency state of the smart glass of the first section of the lens is different than the transparency state of the smart glass of the second section of the lens during at least some time periods that light is generated from the light source.

18. The method of claim 17 wherein the light source comprises one or more LEDs.

19. The method of claim 17 wherein the setting of the transparency of the smart glass of the first section of the lens is performed independently from the setting of the transparency state of the smart glass of the second section of the lens.

20. The method of claim 17 further comprising:
receiving a command over a network; and
setting the transparency state of the smart glass in the first section of the lens and the transparency state of the smart glass in the second section of the lens based on the command.

* * * * *